United States Patent
Li et al.

(10) Patent No.: US 11,894,966 B2
(45) Date of Patent: Feb. 6, 2024

(54) METHOD AND APPARATUS FOR ESTIMATING FREQUENCY OFFSET, ELECTRONIC DEVICE AND COMPUTER-READABLE MEDIUM

(71) Applicant: ZTE CORPORATION, Guangdong (CN)

(72) Inventors: Shuangxi Li, Guangdong (CN); Yangzhong Yao, Guangdong (CN); Nanshan Cao, Guangdong (CN); Yunpeng Li, Guangdong (CN)

(73) Assignee: SANECHIPS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/916,327

(22) PCT Filed: Apr. 2, 2021

(86) PCT No.: PCT/CN2021/085304
§ 371 (c)(1),
(2) Date: Sep. 30, 2022

(87) PCT Pub. No.: WO2021/204084
PCT Pub. Date: Oct. 14, 2021

(65) Prior Publication Data
US 2023/0144980 A1 May 11, 2023

(30) Foreign Application Priority Data
Apr. 7, 2020 (CN) .......................... 202010268523.X (51) Int. Cl.
*H04L 27/26* (2006.01)
*H04L 25/49* (2006.01)

(52) U.S. Cl.
CPC ...... *H04L 27/2657* (2013.01); *H04L 25/4917* (2013.01)

(58) Field of Classification Search
CPC . H04L 27/2657; H04L 25/4917; H04L 27/01; H04L 2027/0026; H04L 27/3881; H04L 27/0014; H04B 10/6164
See application file for complete search history.

(56) References Cited

U.S. PATENT DOCUMENTS

| 5,659,573 A * | 8/1997 | Bruckert | ............... H04J 3/0605 375/365 |
| 5,812,523 A * | 9/1998 | Isaksson | ............. H04L 27/2657 370/208 |
| 2017/0257247 A1* | 9/2017 | Zhao | ................... H04L 27/2692 |

FOREIGN PATENT DOCUMENTS

| CN | 106100738 A | 11/2016 |
| CN | 106330322 A | 1/2017 |
| CN | 109995689 A | 7/2019 |

OTHER PUBLICATIONS

WIPO, International Search Report dated May 17, 2021.

* cited by examiner

*Primary Examiner* — Sung S Ahn
(74) *Attorney, Agent, or Firm* — Li & Cai Intellectual Property (USA) Office (57) ABSTRACT

The present disclosure provides a method for estimating a frequency offset, including: extracting sampling points from an input signal according to preset intervals to obtain a plurality of groups of sampling points, with the preset intervals of the groups of sampling points being different; performing processes on a current sampling point and the groups of sampling points to obtain data of arguments of complex numbers corresponding to the preset intervals; and determining an estimation value of a frequency offset of a current input signal according to the data of arguments of complex numbers corresponding to the preset intervals. The present disclosure further provides an apparatus for estimat- (Continued)

ing a frequency offset, an electronic device and a computer-readable medium.

10 Claims, 4 Drawing Sheets

METHOD AND APPARATUS FOR ESTIMATING FREQUENCY OFFSET, ELECTRONIC DEVICE AND COMPUTER-READABLE MEDIUM

CROSS-REFERENCE TO RELATED APPLICATIONS

The present application claims the priority of Chinese Patent Application No. 202010268523.X, filed on Apr. 7, 2020, the contents of which are incorporated herein in their entirety by reference.

TECHNICAL FIELD

The present disclosure relates to the field of communication technologies, and in particular, to a method for estimating a frequency offset, an apparatus for estimating a frequency offset, an electronic device, and a computer-readable medium.

BACKGROUND

In an optical communication system, frequencies of lasers in a coherent optical transmitter and a coherent optical receiver may not be completely consistent, and a frequency offset may exist between the frequencies, the frequency offset is desired to be estimated in the coherent optical receivers, so as to control or compensate the frequency offset.

SUMMARY

In a first aspect, the present disclosure provides a method for estimating a frequency offset, including:
  extracting sampling points from an input signal according to preset intervals to obtain a plurality of groups of sampling points, with the preset intervals of the groups of sampling points being different;
  performing processes on a current sampling point and the groups of sampling points to obtain data of arguments of complex numbers corresponding to the preset intervals; and
  determining an estimation value of the frequency offset of a current input signal according to the data of arguments of the complex numbers corresponding to the preset intervals.

In a second aspect, the present disclosure provides an apparatus for estimating a frequency offset, including:
  a sampling module configured to extract sampling points from an input signal according to preset intervals to obtain a plurality of groups of sampling points, with the preset intervals of the groups of sampling points being different;
  an obtaining module configured to perform processes on a current sampling point and the groups of sampling points to obtain data of arguments of complex numbers corresponding to the preset intervals; and
  an estimating module configured to determine an estimation value of the frequency offset of a current input signal according to the data of arguments of the complex numbers corresponding to the preset intervals.

In a third aspect, the present disclosure provides an electronic device, including:
  at least one processor;
  a storage device configured to store at least one program, the at least one program, when executed by the at least one processor, causes the at least one processor to perform the method, for estimating a frequency offset, described above; and
  at least one I/O interface, connected between the processor and the storage device and configured to implement information interaction between the processor and the storage device.

In a fourth aspect, the present disclosure provides a computer-readable medium having a computer program stored therein, the computer program, when executed by a processor, performs the method, for estimating a frequency offset, described above.

BRIEF DESCRIPTION OF DRAWINGS

The accompanying drawings illustrated herein are used for providing further understanding to technical solutions of the present disclosure and form a part of the description, together with exemplary embodiments of the present disclosure, are used for explaining the present disclosure, rather than limiting the present disclosure. Features and advantages of the present disclosure will become more apparent to those skilled in the art by describing the exemplary embodiments in detail with reference to the accompanying drawings. In the accompanying drawings.

DETAIL DESCRIPTION OF EMBODIMENTS

In order to make those skilled in the art better understand the technical solutions of the present disclosure, a method for estimating a frequency offset, an apparatus for estimating a frequency offset, an electronic device, and a computer-readable medium according to the present disclosure are further described in detail below with reference to the accompanying drawings.

Exemplary embodiments are described in detail below with reference to the accompanying drawings, but may be embodied in different forms, and should not be construed as a limitation. The embodiments are illustrated merely for those skilled in the art fully understanding the scope of the present disclosure.

The embodiments of the present disclosure and the technical features in the embodiments may be combined with each other if no conflict is incurred.

As used herein, a term "and/or" includes any and all combinations of one or more of listed items.

The terms used in the present disclosure are for a purpose of describing particular embodiments only, and are not intended to limit the present disclosure. As used in the present disclosure, singular forms "a" and "the" are intended to include plural forms as well, i.e., to represent at least one, unless the context clearly defines otherwise. It should further be understood that terms "includes" and/or "made of" in the present disclosure are used to specify a presence of at least one of recited features, integers, steps, operations, elements or components, but may not preclude a presence or an addition of at least one of other features, integers, steps, operations, elements, components or groups thereof.

Unless otherwise defined, meanings of all terms (including technical terms and scientific terms) used herein are same as meanings commonly understood by one of ordinary skill in the art. It should further be understood that terms, such as those defined in common dictionaries, should be construed as having a meaning that is consistent with that in background of the existing art and the present disclosure, and should not be construed as having an idealized or over-formal meaning, unless expressly defined in the present disclosure.

After performing equalization and polarization demultiplexing, a 400 Gb/s polarization multiplexing 16-ary quadrature amplitude modulation (PM-16QAM) coherent optical communication receiver obtains two paths of signals, i.e., an X polarization signal and a Y polarization signal. Since frequencies of lasers in a coherent optical communication transmitter and the coherent optical communication receiver may be incompletely consistent, and a frequency offset exists between the two paths of polarization signals output by an equalizer. The frequency offset is desired to be estimated to acquire an estimation signal of the frequency offset to compensate the frequency of the coherent optical communication receiver, so as to improve signal quality of an optical communication system.

Figure 1:
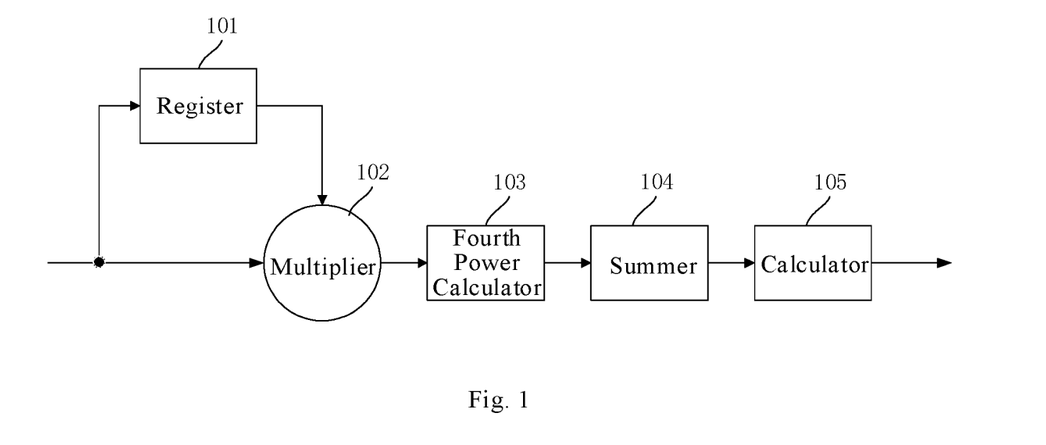
FIG. 1 is an apparatus for estimating a frequency offset according to an existing technology.

FIG. 1 is an apparatus for estimating a frequency offset according to an existing technology. An input complex signal is divided into two paths, one path of complex signal is input to a register 101, and the other one path of complex signal is directly input to a multiplier 102. The register 101 performs delay and conjugate processing on the complex signal to obtain a delayed conjugate signal, and the delayed conjugate signal is input to the multiplier 102. The multiplier 102 multiplies the complex signal and the conjugate signal to obtain a multiplied result signal, and the multiplied result signal is transmitted to a fourth power calculator 103. The fourth power calculator 103 performs a fourth power operation on the multiplied result signal, and then outputs a result to a summer 104. The summer 104 is configured to reduce an effect of noise on an estimation of the frequency offset. Finally, a quarter argument calculator 105 takes a quarter argument of a result output from the summer 104 and outputs an estimation signal of the frequency offset.

In practical applications, a delay D of the register 101 is an integer greater than or equal to 1, and when the delay D is equal to 1, a range of estimation of the frequency offset is relatively wide, but the estimation has a relatively low accuracy; when the delay D increases, the range of estimation of the frequency offset becomes smaller, and the accuracy of the estimation is improved. In order to take into account both a relatively wide range and a relatively high accuracy of estimation of the frequency offset, the delay D is usually set to 1 at a start, and when the estimation of the frequency offset converges to a certain accuracy, the delay D is to be increased. In such way, the delay D may have been switched to a relatively large value, but the estimation of the frequency offset has not yet reached a desired accuracy, resulting in a fuzzy estimation of the frequency offset and a wrong result of estimation of the frequency offset may be output.

In a first aspect, an embodiment of the present disclosure provides a method for estimating a frequency offset, applied to a coherent optical communication receiver and configured to estimate a frequency offset between a frequency of a laser in a coherent optical communication transmitter and a frequency of a laser in the coherent optical communication receiver, so as to compensate or correct the frequency of the coherent optical communication receiver.

The method for estimating the frequency offset according to the present disclosure can perform an estimation on the frequency offset of any one of the X polarization signal and the Y polarization signal, and then applies a result of estimation of the frequency offset to the other polarization signal; or, perform estimations on frequency offsets of the X polarization signal and the Y polarization signal simultaneously. For convenience of description, a case of performing the estimations on the frequency offsets of the X polarization signal and the Y polarization signal simultaneously is described as an example below.

Figure 2:
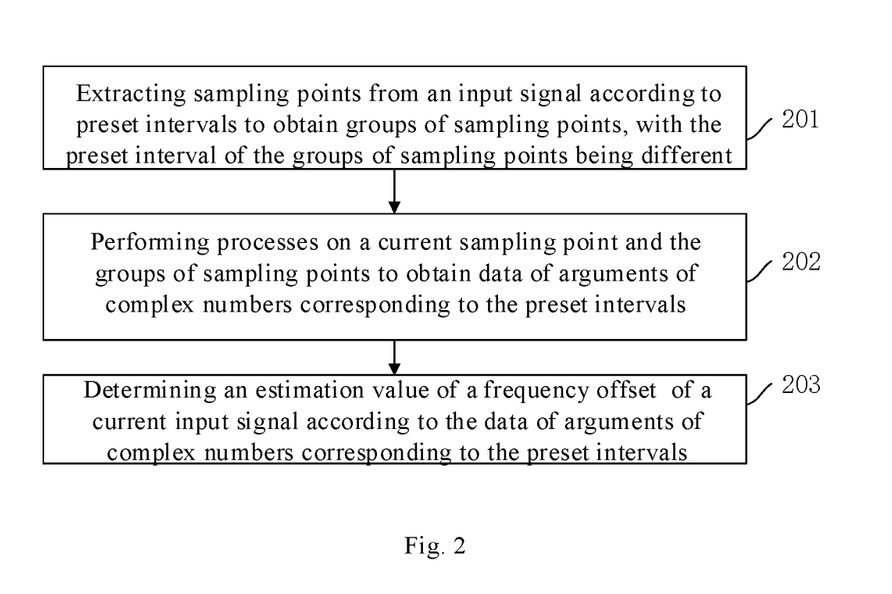
FIG. 2 is a flowchart of a method for estimating a frequency offset according to the present disclosure.

FIG. 2 is a flowchart of a method for estimating a frequency offset according to the present disclosure. Referring to FIG. 2, the method includes following operations 201 to 203.

At operation 201, extracting sampling points from an input signal according to preset intervals to obtain a plurality of groups of sampling points, with the preset intervals of the groups of sampling points being different.

In the present disclosure, the input signal may include a time-domain signal obtained by performing equalization filtering on a digital baseband electric signal, and the signal subjected to the equalization filtering is a signal with a parallelism of 64.

In order to extract sampling points from the input signal, the input signal may be stored first, a length of the input signal to be stored may at least meet a condition for extracting the sampling points, i.e., it is ensured that a desired number of sampling points can be extracted. For example, the length of the input signal to be stored may be represented by a number of sampling points, i.e., may be a result obtained by adding the number of sampling points to be extracted and preset intervals between the sampling points to be extracted. The preset intervals are also referred to as delay intervals, and may be arbitrarily set as desired. For example, each of the preset intervals may be 4, and the sampling points are extracted at intervals of four sampling points (i.e., there are four sampling points, not to be extracted, between any two adjacent ones of the sampling points to be extracted). In addition, the number of sampling points to be extracted may be arbitrarily set as desired, for example, 20, 50 or 80 sampling points are to be extracted. For example, when the sampling points are extracted at intervals of four sampling points and each group of sampling points includes five sampling points, the length of the input signals to be stored should include at least 21 sampling points.

In the present disclosure, the preset intervals of the groups of sampling points are different, i.e., the groups of sampling points group are extracted at different preset intervals. For example, a first group of sampling points may include 32 sampling points, with the preset interval between any two adjacent sampling points in the first group being equal to 1; a second group of sampling points may include 32 sampling points, with the preset interval between any two adjacent sampling points in the second group being equal to 4; and a third group of sampling points may include 32 sampling points, with the preset interval between any two adjacent sampling points in the third group being equal to 16.

It should be noted that, in the present disclosure, the groups of sampling points are extracted from a same object to be sampled, that is, different groups of sampling points are extracted from input signals in a same sampling period.

At operation 202, performing processes on a current sampling point and the groups of sampling points to obtain data of arguments of complex numbers corresponding to the preset intervals.

In the present disclosure, the current sampling point is any one of sampling points in a current input signal, and the current input signal and the input signal used for extracting the groups of sampling points are in a same sampling period.

In the operation 202, performing processes, such as fourth power operation, summation, filtering, argument calculation, and the like, on the current sampling point and the groups of sampling points, to obtain the data of arguments of complex numbers.

The current sampling point and the groups of sampling points are processed to obtain multiple pieces of data of arguments of complex numbers, i.e., each group of sampling points corresponds to one piece of data of argument of complex number. For example, when there are three groups of sampling points, at least three pieces of data of arguments of complex numbers are obtained. When there are a relatively large number of groups of sampling points, a number of pieces of data of arguments of complex numbers to be obtained may be less than a number of the groups of sampling points.

At operation 203, determining an estimation value of a frequency offset of the current input signal according to the data of arguments of the complex numbers corresponding to the preset intervals.

In the operation 203, the estimation value of the frequency offset of the current input signal is determined by using the data of arguments of the complex numbers.

In some implementations, the estimation value of the frequency offset may be determined by estimating a value of the frequency offset level by level for the data of arguments of the complex numbers corresponding to the preset intervals, and an estimation range at each level is a quarter of the estimation range at the previous level.

Figure 3:
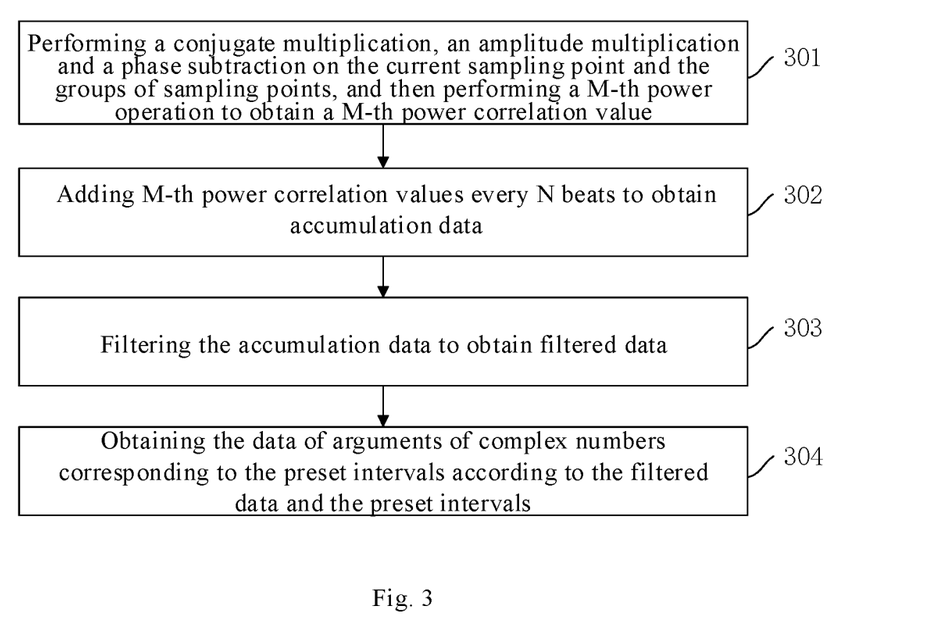
FIG. 3 is a flowchart illustrating operation 202 in a method for estimating a frequency offset according to the present disclosure.

FIG. 3 is a flowchart illustrating operation 202 in a method for estimating a frequency offset according to the present disclosure. As shown in FIG. 3, processes of following operations 301 to 304 are performed on the current sampling point and the sampling points in the each group.

At operation 301, performing a conjugate multiplication, an amplitude multiplication and a phase subtraction on the current sampling point and the sampling points in each group, and then performing a M-th power operation to obtain a M-th power correlation value.

In the operation 301, for the X polarization signal and the Y polarization signal, the conjugate multiplication, the amplitude multiplication, and the phase subtraction are performed on the current sampling point and the sampling points in the each group, and then the M-th power operation is performed to obtain the M-th power correlation value, the M is an integer greater than 2.

For example, the conjugate multiplication, the amplitude multiplication, and the phase subtraction are performed on the current sampling point and three groups of sampling points, and the fourth power operation is performed to obtain fourth power correlation values R1,R2, and R3.

For example, the fourth power correlation values $R_1$, $R_2$, and $R_3$ are calculated by using following formula (1).

$$R_1 = \sum_{t=0}^{31} \tilde{A}_{x,t+1} \tilde{A}_{x,t} e^{j4(\tilde{\theta}_{x,t+1} - \tilde{\theta}_{x,t})} + \sum_{t=0}^{31} \tilde{A}_{y,t+1} \tilde{A}_{y,t} e^{j4(\tilde{\theta}_{y,t+1} - \tilde{\theta}_{y,t})} \quad (1)$$

$$R_2 = \sum_{t=0}^{31} \tilde{A}_{x,t+4} \tilde{A}_{x,t} e^{j4(\tilde{\theta}_{x,t+4} - \tilde{\theta}_{x,t})} + \sum_{t=0}^{31} \tilde{A}_{y,t+4} \tilde{A}_{y,t} e^{j4(\tilde{\theta}_{y,t+4} - \tilde{\theta}_{y,t})}$$

$$R_3 = \sum_{t=0}^{31} \tilde{A}_{x,t+16} \tilde{A}_{x,t} e^{j4(\tilde{\theta}_{x,t+16} - \tilde{\theta}_{x,t})} + \sum_{t=0}^{31} \tilde{A}_{y,t+16} \tilde{A}_{y,t} e^{j4(\tilde{\theta}_{y,t+16} - \tilde{\theta}_{y,t})}$$

In the formula (1), $R_1$ represents a fourth power correlation value for the preset interval of 1, $R_2$ represents a fourth power correlation value for the preset interval of 4, the $R_3$ represents a fourth power correlation value for the preset interval of 16, $\tilde{A}$ represents a signal amplitude, $\tilde{\theta}$ represents a phase of the sampling point extracted, t represents a time of extracting the sampling point, $e^{j4}$ represents the fourth power operation, x represents the X polarization signal, y represents the Y polarization signal, $\tilde{A}_{x,t+1}\tilde{A}_{x,t}$ represents multiplication of signal amplitudes of X polarization signals of the current sampling point and the sampling point extracted at a time (t+1), $\tilde{\theta}_{x,t+1} - \tilde{\theta}_{x,t}$ represents subtraction of phases of the X polarization signals of the current sampling points and the sampling point extracted at the time (t+1), and so on.

It should be noted that, in the above, the fourth power operation is illustrated as an example, and other power operations may also be performed, which is not limited in the present disclosure.

At operation 302, adding M-th power correlation values every N beats (i.e., adding N beats of M-th power correlation values) to obtain accumulation data.

In the present disclosure, N is an integer greater than 2, and N beats of M-th power correlation values represent N M-th power correlation values, that is, N consecutive M-th power correlation values may be accumulated. In the present disclosure, N may be selected to be 32, i.e., every 32 consecutive M-th power correlation values may be accumulated once.

For example, 32 fourth power correlation values are added and summed by using following formula (2) to obtain the accumulation data.

$$\begin{cases} R_{sum,1} = \sum_{count=0}^{31} R_1[count] \\ R_{sum,2} = \sum_{count=0}^{31} R_2[count] \\ R_{sum,3} = \sum_{count=0}^{31} R_3[count] \end{cases} \quad (2)$$

In the formula (2), $R_{sum,1}$ represents accumulation data corresponding to the group of sampling points with the preset interval of 1, $R_1$[count] represents the fourth power correlation value for the preset interval of 1, $R_{sum,2}$ represents accumulation data corresponding to the group of sampling points with the preset interval of 4, $R_2$[count] represents the fourth power correlation value for the preset interval of 4, $R_{sum,3}$ represents accumulation data corresponding to the group of sampling points with the preset interval of 16, and $R_3$[count] represents the fourth power correlation value for the preset interval of 16.

At operation 303, filtering the accumulation data to obtain filtered data.

In the operation 303, a first-order infinite impulse response (IIR) digital filter is used for low-pass filtering, so as to smooth the accumulation data.

For example, the filtered data is calculated by using following formula (3).

$$\begin{cases} R_{avg,1} = R_{avg,1} + \alpha_1 \cdot (R_{sum,1} - R_{avg,1}) \\ R_{avg,2} = R_{avg,2} + \alpha_2 \cdot (R_{sum,2} - R_{avg,2}) \\ R_{avg,3} = R_{avg,3} + \alpha_3 \cdot (R_{sum,3} - R_{avg,3}) \end{cases} \quad (3)$$

In the formula (3), $\alpha_1$, $\alpha_2$, and $\alpha_3$ are configured to be filter coefficients, $R_{avg,1}$ represents filtered data corresponding to the group of sampling points with the preset interval of 1, $R_{avg,2}$ represents filtered data corresponding to the group of sampling points with the preset interval of 4, $R_{avg,3}$ represents filtered data corresponding to the group of sampling points with the preset interval of 16.

At operation 304, obtaining the data of argument of the complex number corresponding to the preset interval according to the filtered data and the preset interval.

In the operation 304, the argument of the complex number is calculated according to the filtered data and the preset interval.

For example, the argument of the complex number is calculated by using following formula (4).

$$\begin{cases} F_1 = \frac{\text{Arg}(R_{avg,1})}{4} \\ F_2 = \frac{\text{Arg}(R_{avg,2})}{16} \\ F_3 = \frac{\text{Arg}(R_{avg,3})}{64} \end{cases} \quad (4)$$

In the formula (4), $F_1$, $F_2$, and $F_3$ each represent the data of argument of the complex number, Arg( ) represents calculating the argument of the complex number in units of turns and with a value generally in a range of [−0.5,0.5] turns, and 4, 16, and 64 are values related to the preset intervals.

In some implementations, the value of the frequency offset is estimated level by level for the data of arguments of the complex numbers corresponding to the preset intervals to obtain the estimation value of the frequency offset of the current input signal. In a process of estimating the value of the frequency offset level by level, and an estimation range at each level is a quarter of the estimation range at the previous level.

Figure 4:
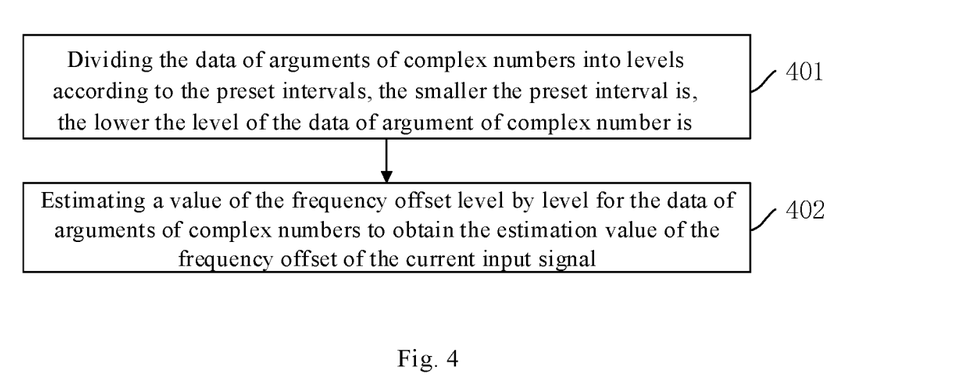
FIG. 4 is a flowchart illustrating operation 203 in a method for estimating a frequency offset according to the present disclosure.

FIG. 4 is a flowchart illustrating operation 203 in a method for estimating a frequency offset according to the present disclosure. As shown in FIG. 4, determining the estimation value of the frequency offset of the current input signal according to the data of arguments of the complex numbers corresponding to the preset intervals (i.e., the operation 203) includes following operations 401 and 402.

At operation 401, dividing the data of arguments of the complex numbers into multiple levels according to the preset intervals, and the smaller the preset interval is, the lower the level of the data of argument of the complex number is.

For example, when the preset intervals are 1, 4, and 16 respectively, the data $F_1$ of argument of complex number for the preset interval of 1 is at a first level, the data $F_2$ of argument of complex number for the preset interval of 4 is at a second level, and the data $F_3$ of argument of complex number for the preset interval of 16 is at a third level.

At operation 402, estimating a value of the frequency offset level by level for the data of arguments of the complex numbers to obtain the estimation value of the frequency offset of the current input signal.

In some implementations, a first-level intermediate estimation value of the frequency offset is obtained based on the data of arguments of complex number at two adjacent levels; a next-level intermediate estimation value of the frequency offset is obtained based on a previous-level intermediate estimation value of the frequency offset and the data of argument of complex number at a next-level, till a final estimation value of the frequency offset of the current input signal is obtained.

In some implementations, the data of arguments of complex numbers at the two adjacent levels may be high truncated to obtain truncated data of argument; and the first-level intermediate estimation value of the frequency offset is obtained based on the truncated data of argument and the data of arguments of the complex numbers.

Figure 5:
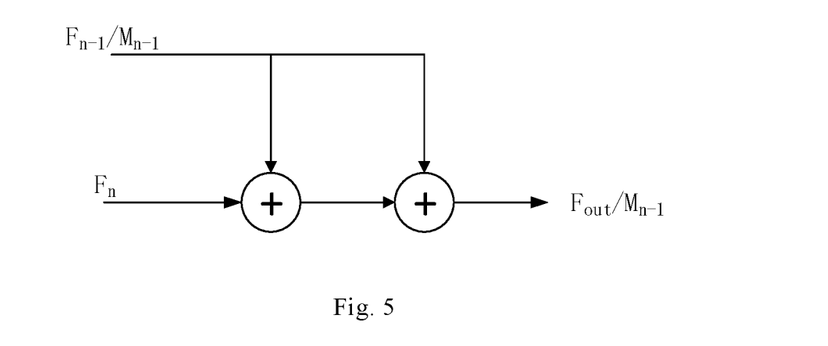
FIG. 5 is a schematic diagram of calculating a frequency offset in a method for estimating a frequency offset according to the present disclosure.

As shown in FIG. 5, an estimation value of the frequency offset of the current input signal is determined through two summers by using the data of arguments of the complex numbers. In the present disclosure, an output bit width of the summer is same as a bit width of an addend input into the summer, and extra high-order bits are truncated. It is assumed that a fixed-point bit width of the argument of complex number is represented as (sign, bit_eff, bit_least), the sign represents a number of symbols, the bit_eff represents an effective bit width, and the bit_least represents a weight of the least significant bit. For example, in the fixed-point bit width (1, 12, 18), the "1" represents the number of symbols, the "12" represents the effective bit width, and the "18" represents that the least significant bit is $2^{-18}$.

In some implementations, determining the estimation value of the frequency offset of the current input signal according to the data of arguments of the complex numbers corresponding to the preset intervals includes: high truncating the value $F_{n-1}$ of argument of complex number at an (n−1)-th level and the value $F_n$ of argument of complex number at an n-th level to obtain a truncated value of argument; adding the truncated value of argument and the value $F_{n-1}$ of argument of complex number at the (n−1)-th level to obtain an intermediate value $M_{n-1}$ of argument at the (n−1)-th level; high truncating the value $F_{n+1}$ of argument of complex number at an (n+1)-th level and the intermediate value $M_{n-1}$ of argument at the (n−1)-th level to obtain a new truncated value of argument; adding the new truncated value of argument and the intermediate value $M_{n-1}$ of argument at the (n−1)-th level, and so on, till finally obtaining the estimation value of the frequency offset of the current input signal.

The three values $F_1$, $F_2$ and $F_3$ of arguments of complex numbers are described below as examples. For example, the value $F_1$ of argument of complex number at the first level is (1, 12, 14), the value $F_2$ of argument of complex number at the second level is (1, 12, 16), and the value $F_3$ of argument of complex number at the third level is (1, 12, 18).

The $F_2$ and $F_1$ are high truncated to obtain a first-level truncated value of argument (1, 12, 16); the first-level truncated value of argument (1, 12, 16) and the $F_1$ are added to obtain an intermediate value $M_1$ of argument, a fixed-point bit width of the $M_1$ is (1, 14, 16); the $F_3$ and the $M_1$ are high truncated to obtain a second-level truncated value of argument (1, 12, 18); the second-level truncated value of argument (1, 12, 18) and the $M_1$ are added to obtain an intermediate value $M_2$ of argument, a fixed-point bit width of the $M_2$ is (1, 16, 18). When there is not any other value of argument of complex number, the $M_2$ is a final estimation value of the frequency offset. When there are other values of arguments of complex numbers, a calculation process continues according to the process for estimating the frequency offset shown in FIG. 3.

Figure 6:
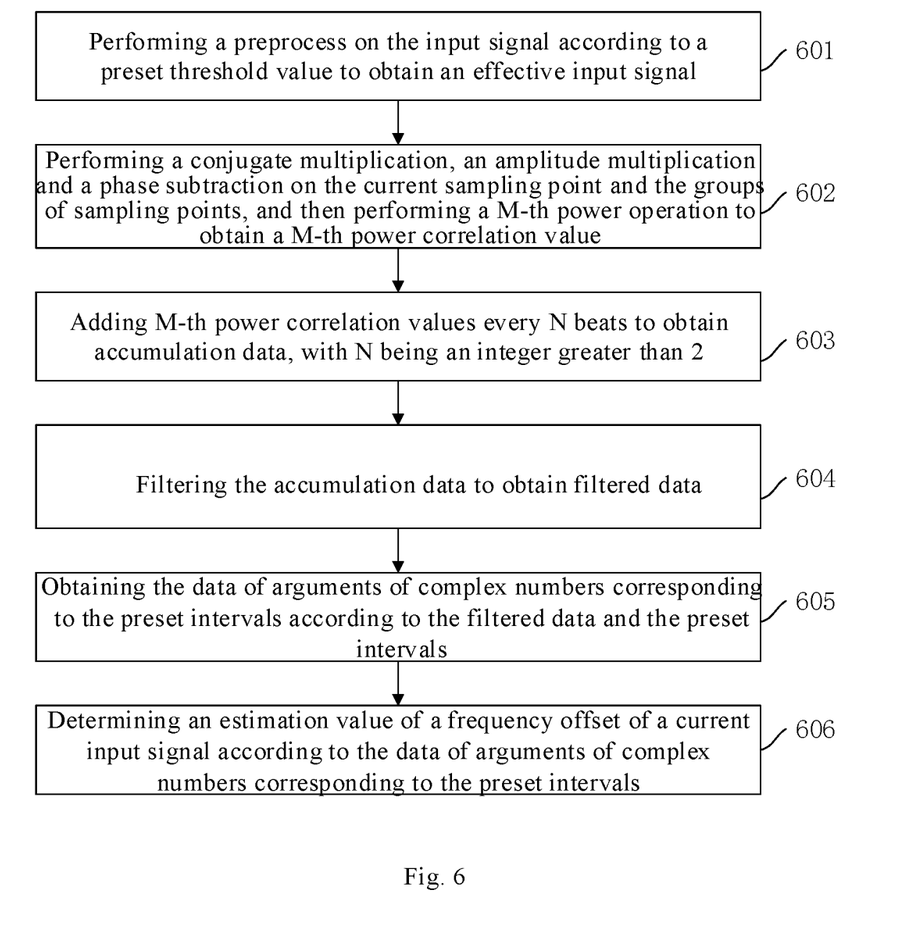
FIG. 6 is a flowchart of a method for estimating a frequency offset according to the present disclosure.

FIG. 6 is a flowchart of a method for estimating a frequency offset according to the present disclosure. As shown in FIG. 6, the method includes following operations 601 to 606.

At operation 601, performing a preprocess on an input signal according to a preset threshold value to obtain an effective input signal.

In the present disclosure, the preset threshold value is set according to characteristics of the input signal, for example, according to a discrete degree of the input signal.

In some implementations, performing the preprocess on the input signal includes performing a circle dividing process on the input signal. The preset threshold value for the circle dividing process may be set according to characteristics of sampling points, so that sampling points suitable to be performed thereon a fourth power estimation are selected. For example, for a 16QAM input signal, according to distances between sampling points and a coordinate axis, four sampling points in an inner circle and four sampling points in an outermost circle in a constellation diagram are extracted, and the other sampling points are set to 0.

At operation 602, performing a conjugate multiplication, an amplitude multiplication and a phase subtraction on the current sampling point and the sampling points in each group, and then performing a M-th power operation to obtain a M-th power correlation value.

In the operation 602, the current sampling point and the sampling points in each group are extracted from the sampling points subjected to the circle dividing process. Other processes are same as the processes in the operation 301 described above, and thus are not repeated here.

At operation 603, adding M-th power correlation values every N beats to obtain accumulation data.

At operation 604, filtering the accumulation data to obtain filtered data.

At operation 605, obtaining data of arguments of complex numbers corresponding to the preset intervals according to the filtered data and the preset intervals.

Implementations of the operations 603 to 605 are same as implementations of the operations 302 to 304 described above, and thus are not repeated here.

At operation 606, determining an estimation value of a frequency offset of a current input signal according to the data of arguments of complex numbers corresponding to the preset intervals.

Implementation of the operation 606 is same as implementation of the operation 203 described above, and thus is not repeated here.

In the method for estimating the frequency offset according to the present disclosure, sampling points are extracted from an input signal according to preset intervals to obtain a plurality of groups of sampling points, and the preset intervals for the groups of sampling points are different; processes are performed on a current sampling point and the groups of sampling points to obtain data of arguments of complex numbers corresponding to the preset intervals; and an estimation value of a frequency offset of a current input signal is determined according to the data of arguments of complex numbers corresponding to the preset intervals. The method for estimating the frequency offset simultaneously utilizes the groups of sampling points with different preset intervals in a calculation of the estimation value of the frequency offset, a range and an accuracy of estimation of the frequency offset may be preset, a full forward calculation structure is adopted, the estimation of the frequency offset is not to be switched in the process of estimating the frequency offset, which avoids an ambiguity of estimation of the frequency offset caused by a loop, and realizes an estimation of the frequency offset, in a relatively wide range and with a relatively high accuracy.

In a second aspect, an embodiment of the present disclosure provides an apparatus for estimating a frequency offset, which is applied to a coherent optical communication receiver and is configured to estimate a frequency offset between a frequency of a laser in a coherent optical communication transmitter and a frequency of a laser in the coherent optical communication receiver, so as to compensate or correct the frequency of the coherent optical communication receiver.

Figure 7:
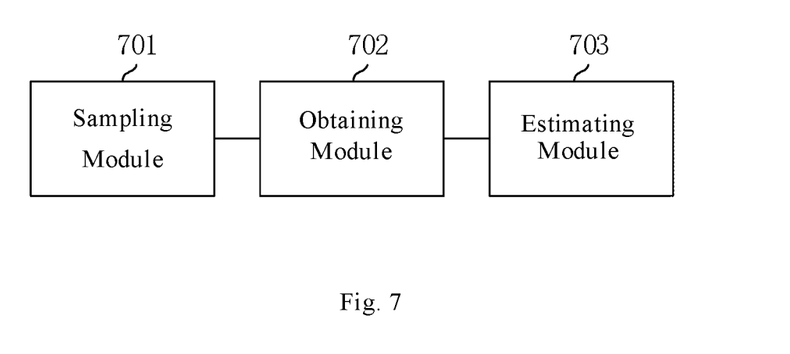
FIG. 7 is a schematic diagram of an apparatus for estimating a frequency offset according to the present disclosure.

FIG. 7 is a schematic diagram of an apparatus for estimating a frequency offset according to the present disclosure. As shown in FIG. 7, the apparatus for estimating the frequency offset includes a sampling module 701, an obtaining module 702, and an estimating module 703.

The sampling module 701 is configured to extract sampling points from an input signal according to preset intervals to obtain a plurality of groups of sampling points, and the preset interval for the groups of sampling points are different.

Implementation of the sampling module 701 is same as implementation of the operation 201 described above, and thus is not repeated here.

The obtaining module 702 is configured to perform processes on a current sampling point and the groups of sampling points to obtain data of arguments of complex numbers corresponding to the preset intervals.

Implementation of the obtaining module 702 is same as implementation of the operation 202 described above, and thus is not repeated here.

The estimating module 703 is configured to determine an estimation value of a frequency offset of a current input signal according to the data of arguments of complex numbers corresponding to the preset intervals.

In some implementations, the estimating module 703 is configured to estimate a value of the frequency offset level by level for the data of arguments of complex numbers corresponding to the preset intervals to obtain the estimation value of the frequency offset of the current input signal.

Implementation of the estimating module 703 is same as implementation of the operation 203 described above, and thus is not repeated here.

Figure 8:
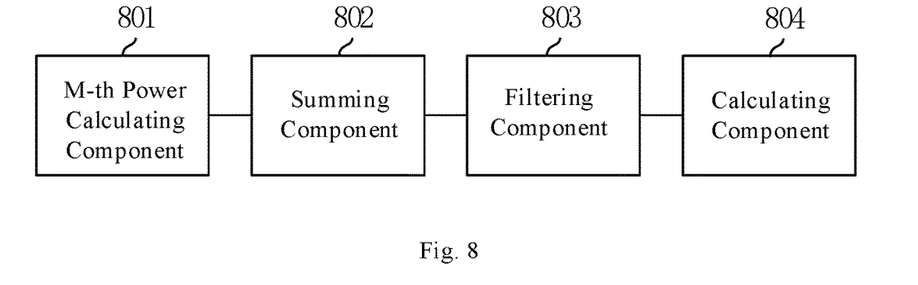
FIG. 8 is a schematic diagram of an obtaining module for obtaining data of arguments of complex numbers in an apparatus for estimating a frequency offset according to the present disclosure.

As shown in FIG. 8, the obtaining module 702 may include:

a M-th power calculating component 801 configured to perform a conjugate multiplication, an amplitude multiplication and a phase subtraction on the current sampling point and the groups of sampling points, and then perform a M-th power operation to obtain a M-th power correlation value, with M being an integer greater than 2;

a summing component 802 configured to add M-th power correlation values every N beats to obtain accumulation data, with N being an integer greater than 2;

a filtering component 803 configured to filter the accumulation data to obtain filtered data; and a calculating component 804 configured to obtain the data of arguments of complex numbers corresponding to the preset intervals according to the filtered data and the preset intervals.

In some implementations, the obtaining module 702 may further include a preprocess component configured to perform a preprocess on the input signal according to a preset threshold value to obtain an effective input signal.

Figure 9:
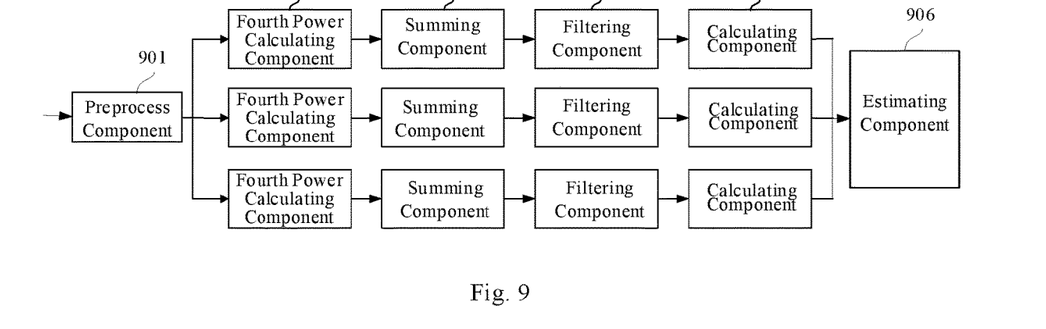
FIG. 9 is a schematic diagram of a partial structure of an apparatus for estimating a frequency offset according to the present disclosure.

In some implementations, as shown in FIG. 9, in the apparatus for estimating the frequency offset, the obtaining module 702 may include a plurality of M-th power calculating components, a plurality of summing components, a plurality of filtering components and a plurality of calculating components, each group of sampling points corresponds to one M-th power calculating component, one summing component, one filtering component and one calculating component. For example, when there are three groups of sampling points, the obtaining module 702 may include one preprocess component 901, three M-th (e.g., fourth) power calculating components 902, three summing components 903, three filtering components 904, three calculating components 905, and one estimating component 906. The data of argument of complex number corresponding to the preset interval for each group of sampling points is obtained through the M-th power calculating component 902, the summing component 903, the filtering component 904, and the calculating component 905, and then is sent to the estimating component 906 to calculate an estimation value of the frequency offset.

It should be noted that, the method and the apparatus for estimating the frequency offset described above do not use a training sequence, do not depend on a synchronous state of a system, and can be applied in an asynchronous state.

In the apparatus for estimating the frequency offset according to the present disclosure, the sampling module extracts sampling points from an input signal according to preset intervals to obtain a plurality of groups of sampling points, and the preset intervals of the groups of sampling points are different; the obtaining module performs processes on a current sampling point and the groups of sampling points to obtain data of arguments of complex numbers corresponding to the preset intervals; and the estimating module 703 is configured to determine an estimation value of a frequency offset of a current input signal according to the data of arguments of complex numbers corresponding to the preset intervals. The apparatus for estimating the frequency offset simultaneously utilizes the groups of sampling points with different preset intervals in a calculation of the estimation value of the frequency offset, a range and an accuracy of estimation of the frequency offset may be preset, a full forward calculation structure is adopted, the estimation of the frequency offset is not to be switched in the process of estimating the frequency offset, which avoids an ambiguity of estimation of the frequency offset caused by a loop, and realizes an estimation of the frequency offset in a relatively wide range and with a relatively high accuracy.

Figure 10:
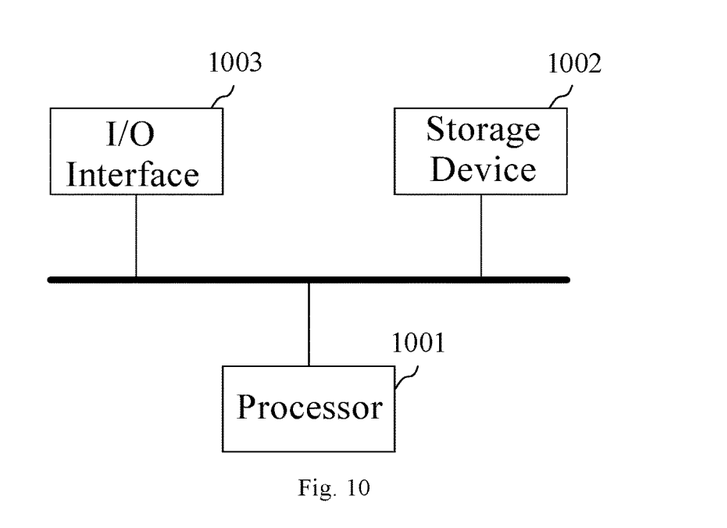
FIG. 10 is a block diagram of an electronic device according to the present disclosure.

In a third aspect, an embodiment of the present disclosure provides an electronic device, including:

at least one processor 1001;

a storage device 1002 configured to store at least one program, the at least one program, when executed by the at least one processor 1001, causes the at least one processor 1001 to perform the method for estimating the frequency offset described above; and at least one I/O interface 1003, connected between the processor 1001 and the storage device 1002, and configured to implement information interaction between the processor 1001 and the storage device 1002.

In the present disclosure, the processor 1001 is a device having a capability of processing data, which includes but is not limited to a Central Processing Unit (CPU), and the like; the storage device 1002 is a device having a capability of storing data, which includes but is not limited to, a random access memory (RAM, in particular, SDRAM, DDR, and the like), a read only memory (ROM), an electrically erasable programmable read only memory (EEPROM), and a FLASH; and the I/O interface 1003 is connected between the processor 1001 and the storage device 1002, is configured to implement information interaction between the processor 1001 and the storage device 1002, and includes but is not limited to a bus and the like.

In some implementations, the processor 1001, the storage device 1002 and the I/O interface 1003 are connected together through the bus, and are further connected to other components of a computing device.

In a fourth aspect, an embodiment of the present disclosure provides a computer-readable medium having a computer program stored therein, the computer program, when executed by a processor, performs the method for estimating the frequency offset described above.

It should be understood by those of ordinary skill in the art that all or some of the operations in the method, the functional modules/components in the apparatus disclosed above may be implemented as software, firmware, hardware, or suitable combinations thereof. In a hardware implementation, the division between the functional modules/components stated above does not correspond to the division of physical components; for example, one physical component may have a plurality of functions, or one function or operation may be performed through cooperation of several physical components. Some or all of the physical components may be implemented as software executed by a processor, such as a central processing unit, a digital signal processor or a microprocessor, or may be implemented as hardware, or may be implemented as an integrated circuit, such as an application specific integrated circuit. Such software may be distributed on a computer-readable medium, the computer-readable medium may include computer storage medium (or non-transitory medium) and communication medium (or transitory medium). The computer storage medium includes volatile/nonvolatile or removable/non-removable medium used in any method or technology for storing information (such as computer-readable instructions, data structures, program modules and other data). The computer storage medium include, but are not limited to, a Random Access Memory (RAM), a Read-Only Memory (ROM), an Electrically Erasable Programmable Read-Only Memory (EEPROM), a flash memory or other memory techniques, a Compact Disc Read-Only Memory (CD-ROM), a Digital Video Disk (DVD) or other optical discs, magnetic cassettes, magnetic tapes, magnetic disks or other magnetic storage devices, or any other medium which can be used to store the desired information and can be accessed by a computer. The communication medium generally includes computer-readable instructions, data structures, program modules or other data in a modulated data signal, such as a carrier wave or other transmission mechanism, and may include any information delivery medium.

The present disclosure discloses the exemplary embodiments, and although specific terms are employed, they are used and should only be interpreted in a generic and descriptive meaning and not for purposes of a limitation. It is apparent to those skilled in the art that features, characteristics and/or elements described in connection with specific embodiments may be used alone or in combination with features, characteristics and/or elements described in connection with other embodiments, unless explicitly stated otherwise. Therefore, it should be understood by those skilled in the art that various changes in form and details may be made without departing from the scope of the present disclosure as set forth in the appended claims.

What is claimed is:

1. A method for estimating a frequency offset, comprising:
   extracting sampling points from an input signal according to preset intervals to obtain a plurality of groups of sampling points, with the preset interval of the groups of sampling points being different;
   performing processes on a current sampling point and the groups of sampling points to obtain data of arguments of complex numbers corresponding to the preset intervals; and
   determining an estimation value of a frequency offset of a current input signal according to the data of arguments of complex numbers corresponding to the preset intervals.

2. The method of claim 1, wherein performing the processes on the current sampling point and the groups of sampling points to obtain the data of arguments of complex numbers corresponding to the preset intervals comprises performing following processes on the current sampling point and the groups of sampling points:
   performing a conjugate multiplication, an amplitude multiplication and a phase subtraction on the current sampling point and the groups of sampling points, and then performing a M-th power operation to obtain a M-th power correlation value, with M being an integer greater than 2;
   adding M-th power correlation values every N beats to obtain accumulation data, with N being an integer greater than 2;
   filtering the accumulation data to obtain filtered data; and
   obtaining the data of arguments of complex numbers corresponding to the preset intervals according to the filtered data and the preset intervals.

3. The method of claim 2, wherein the M-th power operation is a fourth power operation, and the M-th power correlation value is a fourth power correlation value.

4. The method of claim 1, wherein determining the estimation value of the frequency offset of the current input signal according to the data of arguments of complex numbers corresponding to the preset intervals comprises:
   dividing the data of arguments of complex numbers into multiple levels according to the preset intervals; and
   estimating a value of the frequency offset level by level for the data of arguments of complex numbers to obtain the estimation value of the frequency offset of the current input signal.

5. The method of claim 4, wherein estimating the value of the frequency offset level by level for the data of arguments of complex numbers to obtain the estimation value of the frequency offset of the current input signal comprises:
   obtaining a first-level intermediate estimation value of the frequency offset based on the data of arguments of complex numbers at two adjacent levels; and
   obtaining a next-level intermediate estimation value of the frequency offset based on a previous-level intermediate estimation value of the frequency offset and the data of argument of complex number at a next-level, till a final estimation value of the frequency offset of the current input signal is obtained.

6. The method of claim 5, wherein obtaining the first-level intermediate estimation value of the frequency offset based on the data of arguments of complex numbers at the two adjacent levels comprises:
   high truncating the data of arguments of complex numbers at the two adjacent levels to obtain truncated data of argument; and
   obtaining the first-level intermediate estimation value of the frequency offset based on the truncated data of argument and the data of arguments of complex numbers.

7. The method of claim 1, further comprising:
   before extracting the sampling points from the input signal according to the preset intervals to obtain the groups of sampling points, performing a preprocess on the input signal according to a preset threshold value to obtain an effective input signal, wherein the preset threshold value is set according to a discrete degree of the input signal.

8. An apparatus for estimating a frequency offset, comprising:
   a sampling module configured to extract sampling points from an input signal according to preset intervals to obtain a plurality of groups of sampling points, with the preset intervals of the groups of sampling points being different;
   an obtaining module configured to perform processes on a current sampling point and the groups of sampling points to obtain data of arguments of complex numbers corresponding to the preset intervals; and
   an estimating module configured to determine an estimation value of a frequency offset of a current input signal according to the data of arguments of complex numbers corresponding to the preset intervals.

9. An electronic device, comprising:
   at least one processor;
   a storage device configured to store at least one program, the at least one program, when executed by the at least one processor, causes the at least one processor to perform the method of claim 1; and
   at least one I/O interface, connected between the processor and the storage device, and configured to implement information interaction between the processor and the storage device.

10. A non-transitory computer-readable medium having a computer program stored therein, the computer program, when executed by a processor, performs the method of claim 1.

* * * * *